(12) United States Patent
Jeong et al.

(10) Patent No.: US 9,391,507 B2
(45) Date of Patent: Jul. 12, 2016

(54) APPARATUS FOR REGULATING OUTPUT VOLTAGE AND APPARATUS FOR BOOSTING VOLTAGE

(71) Applicant: SAMSUNG ELECTRO-MECHANICS CO., LTD., Suwon, Gyunggi-do (KR)

(72) Inventors: Moon Suk Jeong, Gyunggi-do (KR); Byeong Hak Jo, Gyunggi-do (KR); Yong Il Kwon, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 90 days.

(21) Appl. No.: 14/188,278

(22) Filed: Feb. 24, 2014

(65) Prior Publication Data

US 2015/0162826 A1 Jun. 11, 2015

(30) Foreign Application Priority Data

Dec. 10, 2013 (KR) .................. 10-2013-0152756

(51) Int. Cl.
| | | |
|---|---|---|
| G05F 1/10 | (2006.01) | |
| G05F 3/02 | (2006.01) | |
| H02M 3/07 | (2006.01) | |
| G06F 3/00 | (2006.01) | |
| H02H 9/04 | (2006.01) | |

(52) U.S. Cl.
CPC . H02M 3/07 (2013.01); G06F 3/00 (2013.01); H02H 9/04 (2013.01)

(58) Field of Classification Search
CPC ...................................... H02M 3/07
USPC ........................................... 327/541
See application file for complete search history.

(56) References Cited

U.S. PATENT DOCUMENTS

| | | | | |
|---|---|---|---|---|
| 7,468,723 | B1 * | 12/2008 | Collins ............... | H05B 33/0815 345/102 |
| 2010/0302693 | A1 * | 12/2010 | Hayashi ............. | H01L 27/0251 361/56 |
| 2012/0230071 | A1 * | 9/2012 | Kaneda ................ | H02M 3/073 363/59 |
| 2013/0069711 | A1 * | 3/2013 | Chen ..................... | H02M 3/07 327/536 |
| 2013/0234768 | A1 | 9/2013 | Murata et al. | |

FOREIGN PATENT DOCUMENTS

| | | |
|---|---|---|
| JP | 2010057230 A * | 3/2010 |
| KR | 2000-0026486 A | 5/2000 |
| KR | 10-2010-0107198 A | 10/2010 |
| KR | 10-2013-0103440 A | 9/2013 |

OTHER PUBLICATIONS

Korean Office Action issued in Korean Application No. 10-2013-0152756 dated Jan. 21, 2015, with English Translation.

* cited by examiner

Primary Examiner — Sibin Chen
Assistant Examiner — Metasebia Retebo
(74) Attorney, Agent, or Firm — NSIP Law

(57) ABSTRACT

There is provided an apparatus for regulating an output voltage, including: a sensing circuit sensing an output voltage from a charge pump; a comparator circuit receiving the output voltage from the sensing circuit so as to compare it with a predetermined reference voltage; and a limiter circuit regulating the output voltage according to an output signal from the comparator circuit.

4 Claims, 4 Drawing Sheets

APPARATUS FOR REGULATING OUTPUT VOLTAGE AND APPARATUS FOR BOOSTING VOLTAGE

CROSS-REFERENCE TO RELATED APPLICATION

This application claims the benefit of Korean Patent Application No. 10-2013-0152756 filed on Dec. 10, 2013, with the Korean Intellectual Property Office, the disclosure of which is incorporated herein by reference.

BACKGROUND

The present disclosure relates to an apparatus for regulating an output voltage and an apparatus for boosting a voltage.

A touchscreen pad is a device enabling a user to input data by simply touching a screen with her/his finger or another object. To date, such a touchscreen pad has been typically used in industrial or manufacturing facilities. As such touchscreen pads have evolved to have greater responsiveness and multi-touch capabilities, these devices have come into common use in relatively small devices such as mobile phones and display devices.

Further, as touchscreen pad technology is rapidly advancing, electronic devices such as laptop computers, mobile phones and smartphones are increasingly being provided with touch panels, in place of traditional data input devices such as keyboards and computer mice. Touch panels may be divided into capacitive touch panels and resistive touch panels, and recently, the former have been more commonly employed.

Capacitive touch panel determine the position of a touch by detecting changes in capacitance occurring in capacitors when touched by a finger. Unfortunately, capacitive touch panels have a drawback in that a signal to noise ratio (SNR) may be reduced due to external noise (power noise, LCD noise and the like) as the size of a touch panel is increased, and thus a touch may not be readily recognized. To overcome this, a method of boosting a voltage by using a charge pump so that the panels are robust against noise is commonly used. A charge pump has characteristics in which an output voltage therefrom varies according to a load current, and the output voltage from the charge pump may be increased due to external factors or the like.

Patent Document 1 below discloses a charge pump circuit able to obtain a desired output voltage without exceeding withstanding voltages of integrated circuits or the like by controlling levels of charges accumulated in a charge accumulation capacitor. However, Patent Document 1 fails to disclose the feature of regulating the output voltage from a charge pump by way of reducing the output voltage if it is sensed that the output voltage from the charge pump becomes higher, as will be discussed in the present disclosure.

RELATED ART DOCUMENT (Patent Document 1) Korean Patent Laid-Open Publication No. 2010-0107198

SUMMARY

An aspect of the present disclosure may provide an apparatus for regulating an output voltage from a charge pump that reduces the output voltage if it is sensed that the level of the output voltage is increased due to load current or external factors, and an apparatus for boosting a voltage.

According to an aspect of the present disclosure, an apparatus for regulating an output voltage may include: a sensing circuit sensing an output voltage from a charge pump; a comparator circuit receiving the output voltage from the sensing circuit so as to compare it with a predetermined reference voltage; and a limiter circuit regulating the output voltage according to an output signal from the comparator circuit.

The sensing circuit may include at least one resistor for sensing the output voltage from the charge pump.

The comparator circuit may include at least one comparator comparing the output voltage with the predetermined reference voltage so as to output the output signal to the limiter circuit according to the comparison result.

The limiter circuit may include: first and second diode circuits including a plurality of diodes connected in series; and a switching circuit having one terminal connected to a first node between the first and second diode circuits and having the other terminal grounded.

The switching circuit may perform switching operations according to the output signal to connect or disconnect a signal path between the first node and ground.

According to another aspect of the present disclosure, an apparatus for regulating an output voltage may include: a sensing circuit sensing an output voltage from a charge pump; a first comparator circuit comparing the output voltage with a first reference voltage to generate a first output signal; a second comparator circuit comparing the output voltage with a second reference voltage to generate a second output signal; and a limiter circuit performing switching operations according to the first and second output signals received from the first and second comparator circuits, respectively, to regulate the output voltage.

The limiter circuit may include: first to third diode circuits including a plurality of diodes connected in series; a first switch having one terminal connected to a first node between the first and second diode circuits, and the other terminal grounded; and a second switch having one terminal connected to a second node between the second and third diode circuits, and the other terminal grounded.

The limiter circuit may switch the first switch on and off according to the first output signal received from the first comparator circuit so as to connect or disconnect a signal path between the first node and ground, and the limiter circuit switches the second switch on and off according to the second output signal received from the second comparator circuit so as to connect or disconnect a signal path between the second node and ground.

The first and second switches may be field effect transistors (FETs) or bipolar junction transistors (BJTs).

According to another aspect of the present disclosure, an apparatus for boosting a voltage may include: a charge pump boosting an input voltage by performing switching operations to output a first output voltage; an output voltage regulating unit detecting the first output voltage from the charge pump, comparing the detected first output voltage with a predetermined reference voltage, and adjusting a level of the detected first output voltage based on the comparison result so as to generate a second output voltage; an oscillator adjusting a switching frequency of the charge pump; a regulator supplying the charge pump with driving power; and an inverter controlling operations of the charge pump using the driving power received from the regulator.

The output voltage regulating unit may include a sensing circuit sensing a first output voltage from a charge pump; a comparator circuit comparing the first output voltage from the sensing circuit with a predetermined reference voltage to generate an output signal; and a limiter circuit performing switching operations according to the output signal and regulating the first output voltage according to the switching operations to generate a second output voltage.

The limiter circuit may include: first and second diode circuits including a plurality of diodes connected in series; and a switching circuit having one terminal connected to a first node between the first and second diode circuits and having the other terminal grounded, the switching circuit performing switching operations according to the output signal to connect or disconnect a signal path between the first node and ground.

The switching circuit may perform switching operations according to the output signal to connect or disconnect a signal path between the first node and ground.

The apparatus for boosting a voltage may further include: a driving circuit connected to the output voltage regulating unit and outputting the second output voltage received from the output voltage regulating unit to the output terminal.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
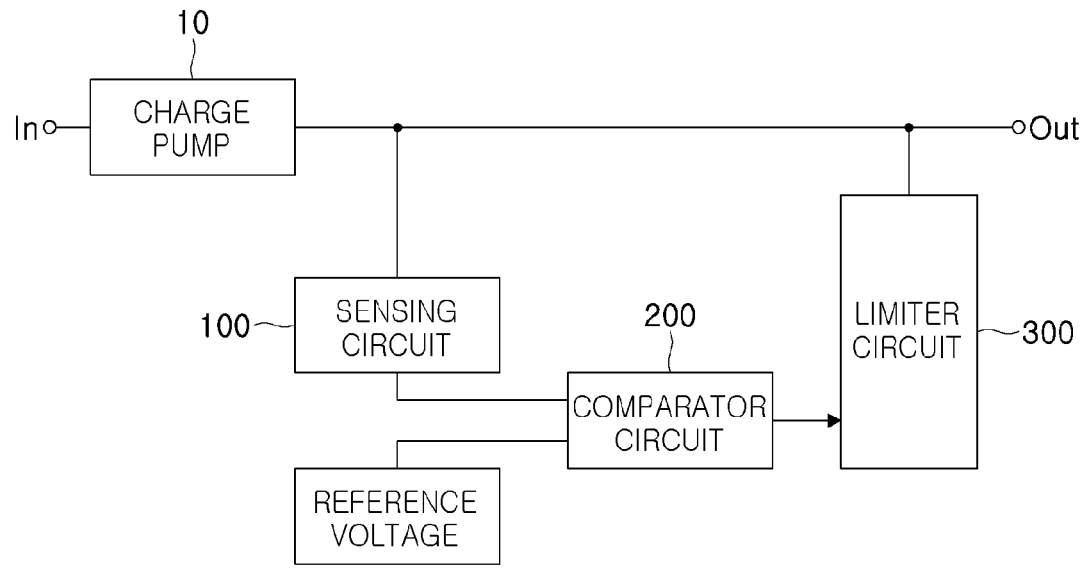
FIG. 1 is a block diagram illustrating an apparatus for regulating an output voltage according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram illustrating an apparatus for regulating an output voltage according to an exemplary embodiment of the present disclosure.

Figure 2:
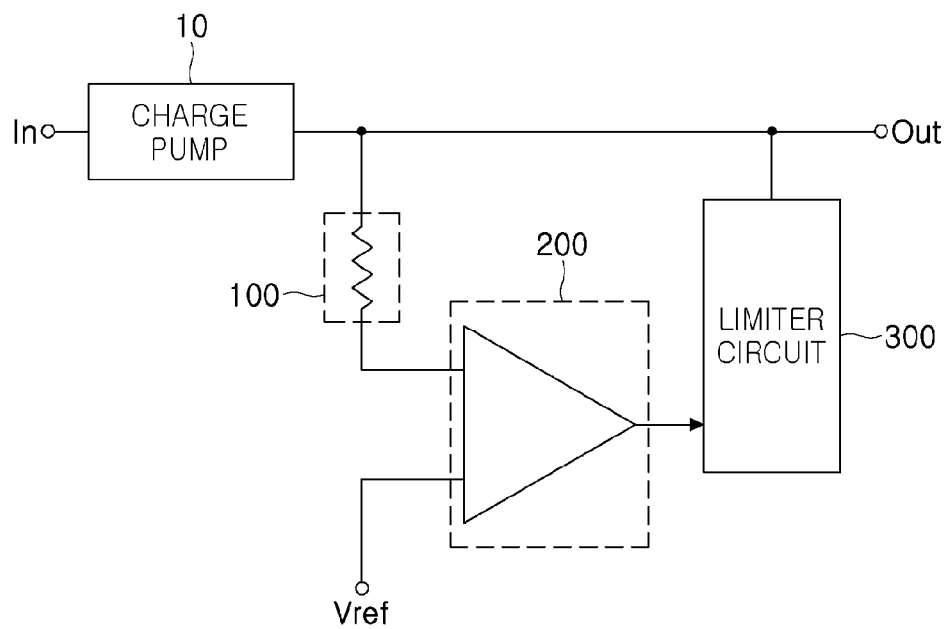
FIG. 2 is a block diagram illustrating the apparatus for regulating an output voltage of FIG. 1 in more detail.

FIG. 2 is a block diagram illustrating the apparatus for regulating an output voltage of FIG. 1 in more detail.

Referring to FIGS. 1 and 2, the apparatus for regulating an output voltage according to the exemplary embodiment may include a sensing circuit 100, a comparator circuit 200, and a limiter circuit 300.

The sensing circuit 100 may sense an output voltage from a charge pump 10. That is, the sensing circuit 100 may be connected to the output terminal of the charge pump 10 and may include at least one resistor 100. Although the sensing circuit 100 performs voltage sensing by dividing resistors in the exemplary embodiment, the resistor may be replaced by a MOS in a CMOS process, such that the area of the apparatus for regulating an output voltage may be reduced.

The comparator circuit 200 may compare the output voltage from the charge pump 10 via the sensing circuit 100 with a predetermined reference voltage Vref. The comparator circuit 200 may be connected to the sensing circuit 100 and may include at least one comparator 200. In addition, the reference voltage Vref may be previously determined to be input to the comparator circuit 200. Since the output voltage from the charge pump 10 may be increased by external factors, the reference voltage Vref may be determined by dropping the level of the output voltage using a resistor ladder.

Then, the comparator circuit 200 may output a signal indicating the comparison result to the limiter circuit 300.

The limiter circuit 300 may receive the signal indicating the comparison result from the comparator circuit 200. Further, the limiter circuit 300 may be connected between the charge pump 10 and an output terminal Out and may attenuate the output voltage from the charge pump 10 if it is higher than the reference voltage Vref due to external factors. That is, the limiter circuit 300 may regulate the output voltage from the charge pump 10 by decreasing it if it is higher than a desired voltage (reference voltage Vref).

Figure 3:
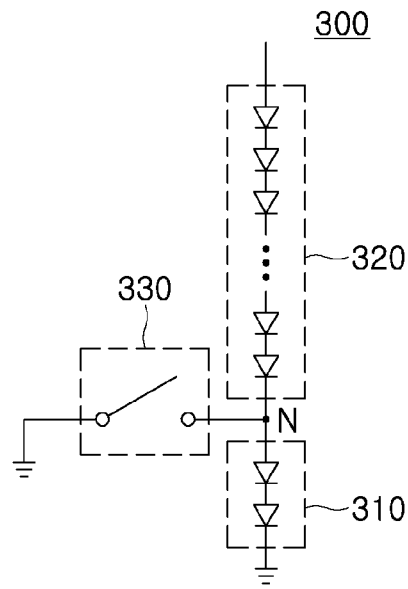
FIG. 3 is a circuit diagram of an example of the limiter circuit shown in FIG. 1.

FIG. 3 is a circuit diagram of an example of the limiter circuit 300 shown in FIG. 1.

Referring to FIG. 3, the limiter circuit 300 may include first and second diode circuit units 310 and 320 that have a plurality of diodes connected in series, and a switching circuit 330.

That is, the output signal from the comparator circuit 200 may be transmitted to the limiter circuit 300 so that the switching circuit 330 may perform switching operations. The number of stages of the plurality of diodes included in the first and second diode circuit 310 and 320 in the limiter circuit 300 may be determined based on a desired value of the output voltage from the charge pump 10.

Figure 4:
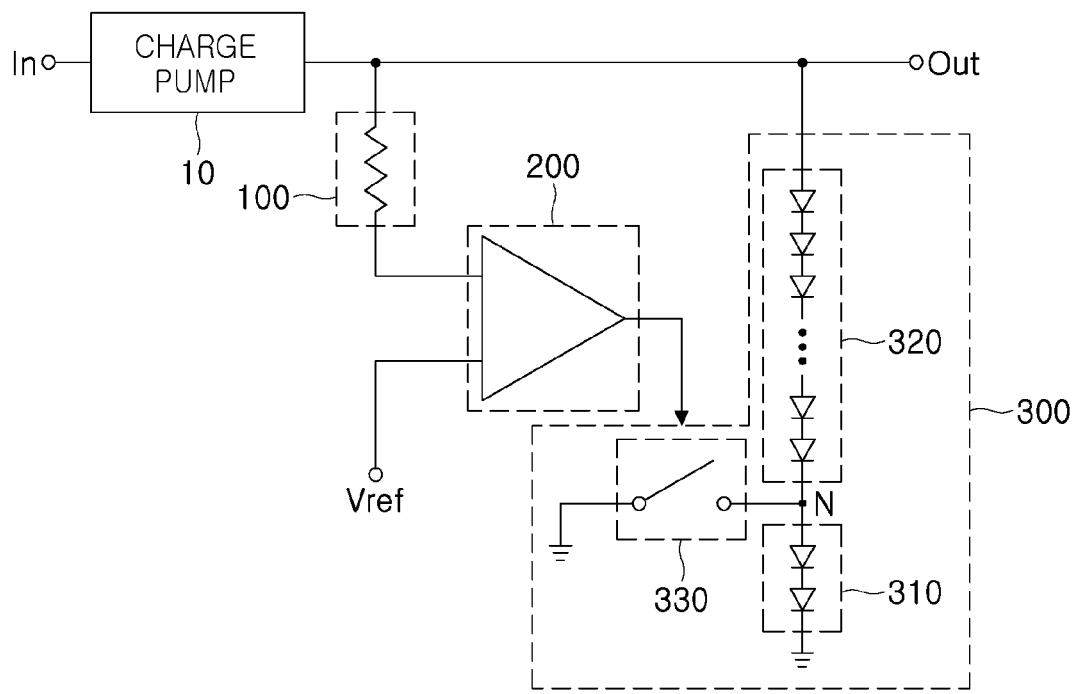
FIG. 4 is a circuit diagram of the apparatus for regulating an output voltage of FIG. 1 in more detail.

FIG. 4 is a circuit diagram of the apparatus for regulating an output voltage of FIG. 1 in more detail.

Referring to FIG. 4, the operation of the apparatus for regulating an output voltage according to the exemplary embodiment will be described in detail. Initially, the sensing circuit 100 may sense an output voltage from the charge pump 10. The sensing circuit 100 may output the sensed output voltage to the comparator circuit 200.

The comparator circuit 200 may receive the output voltage from the charge pump 10 and a predetermined reference voltage Vref to compare them with each other. Then, the comparator circuit 200 may create a signal indicating the comparison result to output it to the switching circuit 330.

The switching circuit 330 has one terminal thereof connected to a node N and the other terminal thereof grounded, such that it may connect or disconnect a signal path between ground and the node N by performing switching operations. In addition, the switching circuit 330 may be turned on or off according to the signal indicating the comparison result from the comparator circuit 200. In an exemplary embodiment, the switch included in the switching circuit 330 may be field effect transistor (FETs) or bipolar junction transistor (BJTs).

According to an exemplary embodiment of the present disclosure, each of the plurality of diodes included in the first and second diode circuit units 310 and 320 may be turned on typically at 0.7 V, and the number of stages of the plurality of diodes may be determined according to a desired output voltage from the charge pump 10.

Figure 5:
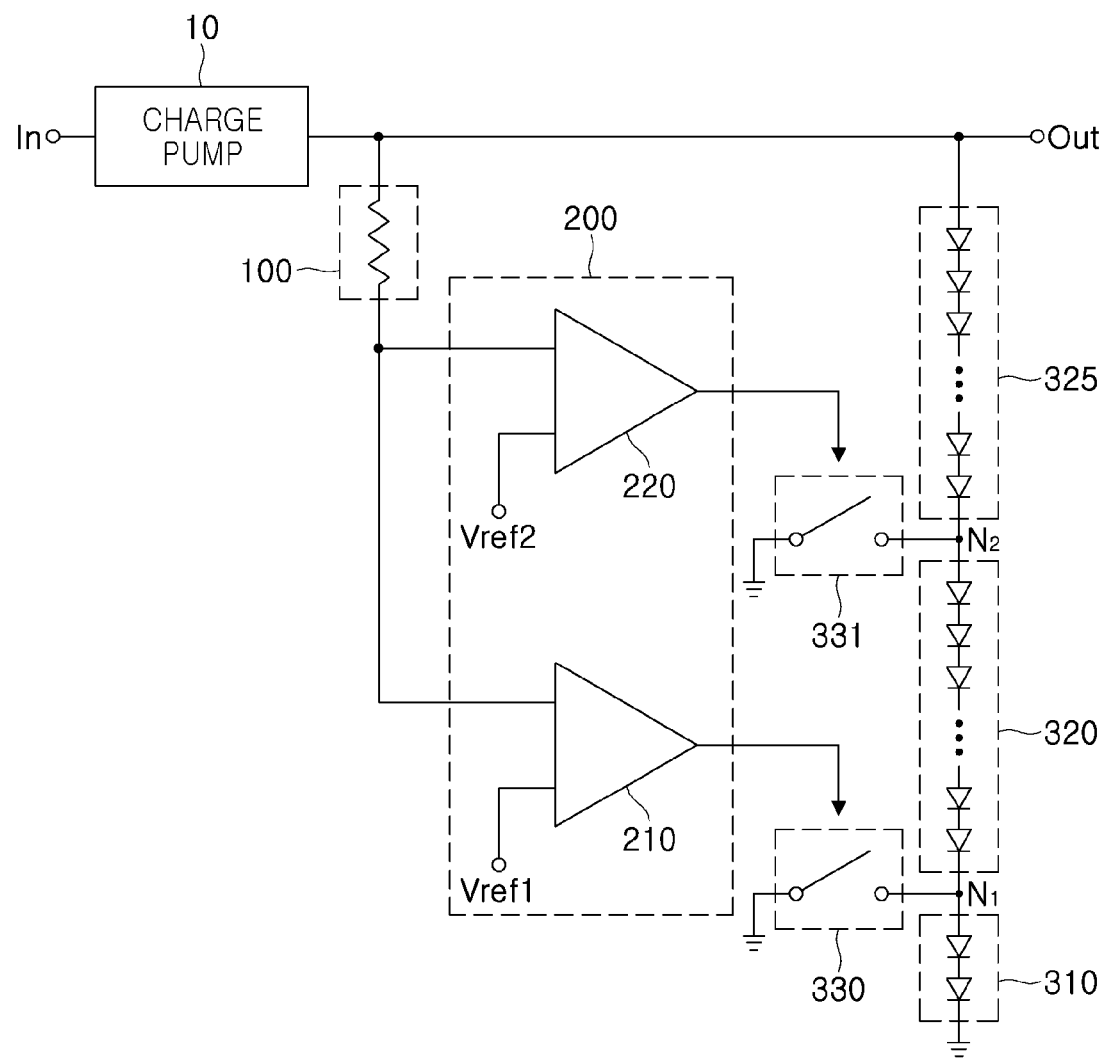
FIG. 5 is a block diagram illustrating an apparatus for regulating an output voltage according to another exemplary embodiment of the present disclosure.

FIG. 5 is a block diagram illustrating an apparatus for regulating an output voltage according to another exemplary embodiment of the present disclosure.

Referring to FIG. 5, in the apparatus for regulating an output voltage according to another exemplary embodiment of the present disclosure, the number of stages of the plurality of diodes included in the limiter circuit 300 and the number of comparators included in the comparator circuit 200 may be changed according to a desired output voltage from the charge pump 10.

In the example shown in FIG. 5, the comparator circuit 200 includes first and second comparators 210 and 220, and the limiter circuit 300 includes first to third diode circuit units 310, 320 and 330, each of which has a plurality of diodes.

In addition, the limiter circuit 300 may further include a first switch 330 that receives a first output signal indicating the comparison result from the first comparator circuit 210 to perform switching operations, and a second switch 331 that receives a second output signal indicating the comparison result from the second comparator circuit 220 to perform switching operations.

The first switch 330 may have one terminal thereof connected to a first node N1 and the other terminal thereof grounded, such that it may connect or disconnect a signal path between ground and the first node N1 by performing switching operations.

The second switch 331 may have one terminal thereof connected to a second node N2 and the other terminal thereof grounded, such that it may connect or disconnect a signal path between ground and the second node N2 by performing switching operations.

In an exemplary embodiment, the first and second switches 330 and 331 may be field effect transistors (FETs) or bipolar junction transistors (BJTs).

That is, the apparatus for regulating an output voltage according to the exemplary embodiment may sense an output voltage from the charge pump 10 with the sensing circuit 100, and the sensed output voltage from the charge pump 10 may be received by the first and second comparators 210 and 220.

Then, the first comparator 210 may generate the first output signal by comparing the output voltage from the charge pump 10 via the sensing circuit 100 with a first predetermined reference voltage Vref1, and the second comparator 220 may generate the second output signal by comparing the output voltage from the charge pump 10 via the sensing circuit 100 with a second predetermined reference voltage Vref2.

The first output signal may be provided to the first switch 330 and the second output signal may be provided to the second switch 331. Accordingly, in order to obtain a desired value of the output voltage from the charge pump 10, the apparatus for regulating an output voltage according to the exemplary embodiment may compare the first and second reference voltages Vref1 and Vref2 with the output voltage, and accordingly perform switching operations to change the number of the stages of the plurality of diodes, to thereby attenuating the level of the output voltage.

Figure 6:
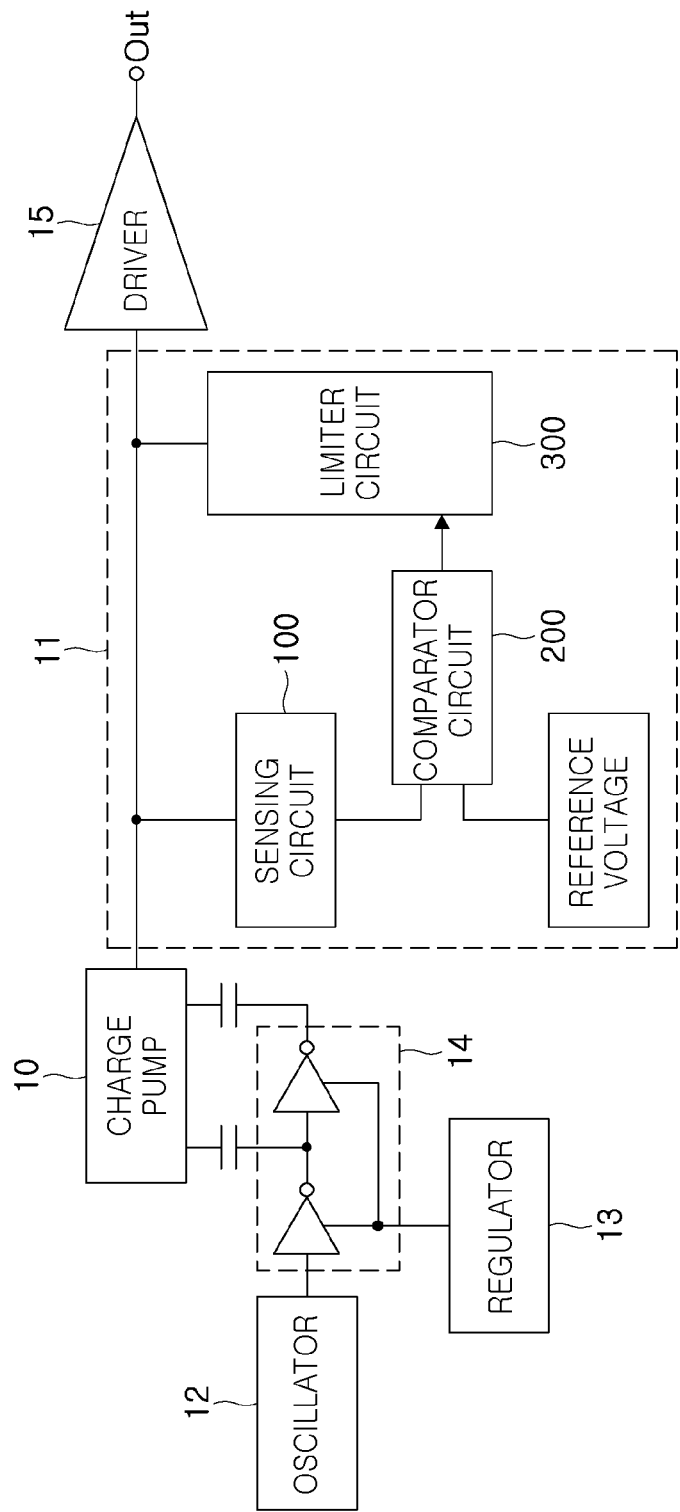
FIG. 6 is a block diagram of an apparatus for boosting a voltage including the apparatus for regulating an output voltage according to an exemplary embodiment of the present disclosure as an output voltage regulating unit.

FIG. 6 is a block diagram of an apparatus for boosting a voltage including an apparatus for regulating an output voltage according to an exemplary embodiment of the present disclosure as an output voltage regulating unit.

Referring to FIG. 6, the apparatus for boosting a voltage according to another exemplary embodiment of the present disclosure may include a charge pump 10 boosting an input voltage by performing switching operations to output a first output voltage; an output voltage regulating unit 11 sensing the first output voltage from the charge pump 10, comparing the sensed first output voltage with the a predetermined reference voltage Vref to adjust the level of the sensed first output voltage based on the comparison result, to output a second output voltage; an oscillator 12 adjusting a switching frequency of the charge pump 10; a regulator 13 supplying the charge pump 10 with driving power; and an inverter 14 controlling the operation of the charge pimp 10 using the driving power received from the regulator 13.

The apparatus for boosting a voltage may further include a driving circuit 15 connected to the output voltage regulating unit 11 and outputting the second output voltage received from the output voltage regulating unit 11 to the output terminal.

The output voltage regulating unit 11 may include a sensing circuit 100, a comparator circuit 200, and a limiter circuit 300. The comparator circuit 200 may receive the output voltage from the charge pump 10 and a predetermined reference voltage Vref for comparison. Then, the comparator circuit 200 may create a signal indicating the comparison result to be output to the switching circuit 330. The switch 330 has one terminal thereof connected to a node N and the other terminal thereof grounded, such that a signal path between ground and the node N may connected or disconnected by performing switching operations.

In addition, the switch 330 may be turned on or off according to the signal indicating the comparison result from the comparator circuit 200.

As set forth above, according to exemplary embodiments of the present disclosure, the output voltage from a charge pump may be reduced to a level within a predetermined range, if it is sensed that the level of the output voltage is increased due to external factors, such that the output voltage may be stabilized and the SNR characteristic may by improved.

While exemplary embodiments have been shown and described above, it will be apparent to those skilled in the art that modifications and variations could be made without departing from the spirit and scope of the present disclosure as defined by the appended claims.

What is claimed is:

1. An apparatus for boosting a voltage, comprising:
   a charge pump configured to boost an input voltage by performing switching operations to output a first output voltage;
   an output voltage regulating unit configured to
      detect the first output voltage from the charge pump,
      compare the detected first output voltage with a reference voltage, and
      adjust a level of the detected first output voltage based on a result of the comparing so as to generate a second output voltage;
   an oscillator configured to adjust a switching frequency of the charge pump;
   a regulator configured to supply the charge pump with driving power;
   an inverter configured to control operations of the charge pump using the driving power received from the regulator; and
   a limiter circuit comprising:
      first and second diode circuits, comprising diodes connected in series between an output terminal of the apparatus and ground; and
      a switching circuit having a first terminal connected to a first node between the first and second diode circuits and having a second terminal grounded.

2. The apparatus of claim 1, wherein the output voltage regulating unit comprises:
   a sensing circuit configured to sense the first output voltage from the charge pump;

a comparator circuit configured to compare the first output voltage from the sensing circuit with the reference voltage to generate an output signal; and wherein the limiter circuit is configured to perform the switching operations according to the output signal and to regulate the first output voltage according to the switching operations to generate the second output voltage.

3. The apparatus of claim 1, wherein the switching circuit performs the switching operations according to an output signal to connect or disconnect a signal path between the first node and ground.

4. The apparatus of claim 1, further comprising: a driving circuit connected to the output voltage regulating unit and configured to output the second output voltage received from the output voltage regulating unit to the output terminal.

\* \* \* \* \*